United States Patent
Jinzaki et al.

(10) Patent No.: US 7,007,199 B2
(45) Date of Patent: Feb. 28, 2006

(54) RELIABLE COMMUNICATION METHOD AND DEVICE

(75) Inventors: Akira Jinzaki, Kawasaki (JP); Jun Kawai, Kawasaki (JP); Osamu Shimokuni, Kawasaki (JP); Junichiro Shitami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 81 days.

(21) Appl. No.: 10/952,409

(22) Filed: Sep. 28, 2004

(65) Prior Publication Data

US 2005/0229038 A1    Oct. 13, 2005

(30) Foreign Application Priority Data

Feb. 27, 2004   (JP)   .............. 2004-055376

(51) Int. Cl.
   *G06F 11/00*   (2006.01)
(52) U.S. Cl. ........................................ 714/18; 370/236
(58) Field of Classification Search ............... 714/18, 714/4, 6, 19, 21, 43, 48; 370/236, 216, 389
   See application file for complete search history.

(56) References Cited

U.S. PATENT DOCUMENTS 5,077,655 A * 12/1991 Jinzaki ................. 709/237
5,701,312 A    12/1997 DeLuca et al.
5,734,643 A *  3/1998 Rondeau ................ 370/279
6,404,739 B1 * 6/2002 Gonno ................... 370/236
6,625,166 B1 * 9/2003 Tsukamoto et al. ...... 370/466
6,820,231 B1 * 11/2004 Lee et al. ................ 714/781
2002/0019967 A1* 2/2002 Bonifas .................. 714/786
2002/0028688 A1   3/2002 Lee et al.
2002/0114342 A1   8/2002 Yao
2002/0145972 A1* 10/2002 Windecker ............ 370/216
2003/0140167 A1*  7/2003 Harvey et al. .......... 709/238

FOREIGN PATENT DOCUMENTS

| JP | 05-122278 | 5/1993 |
|---|---|---|
| JP | 05-183644 | 7/1993 |
| JP | 11-196041 | 7/1999 |
| JP | 2001-237883 | 8/2001 |
| JP | 2002-247132 | 8/2002 |

* cited by examiner

Primary Examiner—Nadeem Iqbal
(74) Attorney, Agent, or Firm—Katten Muchin Rosenman LLP (57) ABSTRACT

A transmitter redundantly transmits data in an available band range when transmitting data. A receiver discards redundancy and receives the data. The receiver also redundantly transmits ack in an available band range. Since data is redundantly transmitted/received, there is a high possibility that data may reach the opposite party normally even if one of the duplicate data is lost. Accordingly, high-speed communication can be realized. Since time no data flows through a communication route is reduced, network resources can be effectively utilized.

15 Claims, 7 Drawing Sheets

|    | byte0 | byte1 | byte2 | byte3 |
|----|-------|-------|-------|-------|
| 0  | VERS | HLEN | TOS | TOTAL LENGTH |
| 4  | IDENTIFICATION | | FLAGS | FRAGMENT OFFSET |
| 8  | TIME TO LIVE | PROTOCOL | HEADER CHECKSUM | |
| 12 | SOURCE IP ADDRESS | | | |
| 16 | DESTINATION IP ADDRESS | | | |
| 20 | IP OPTIONS & PADDING | | | |

RELIABLE COMMUNICATION METHOD AND DEVICE

BACKGROUND OF THE INVENTION

1. Field of the Invention

The present invention relates to a reliable communication method and a device thereof.

2. Description of the Related Art

In communication, a function to communicate data among communicators without omission or repetition and maintaining order is essential. In the following description, "reliable communication" means such communication.

TCP (transmission control protocol) used in the Internet is a typical communication method for realizing the "reliable communication".

In order to realize "reliable communication", theoretically, a receiver notifies a transmitter of the reception of data (acknowledgement, hereinafter abbreviated "ack"), and the transmitter must re-transmit the data in response to this reception notice, which is called "re-transmission control method". As its prior art, ARQ (automatic repeat request) is known as a basic method. The ack method includes its variations, such as Stop and Wait, Go Back N, Selective ACK and the like.

As another reliable communication method, there is Forward Error Correction (FEC). In this technology, a transmitter anticipates data loss and transmits data to which redundant data, such as error correction information or the like is added, and a receiver reproduces original data from the received data. However, if data loss becomes large as unexpected, original data cannot be reproduced. Therefore, the method cannot be always used. So, FEC method is out of question.

Figure 1:
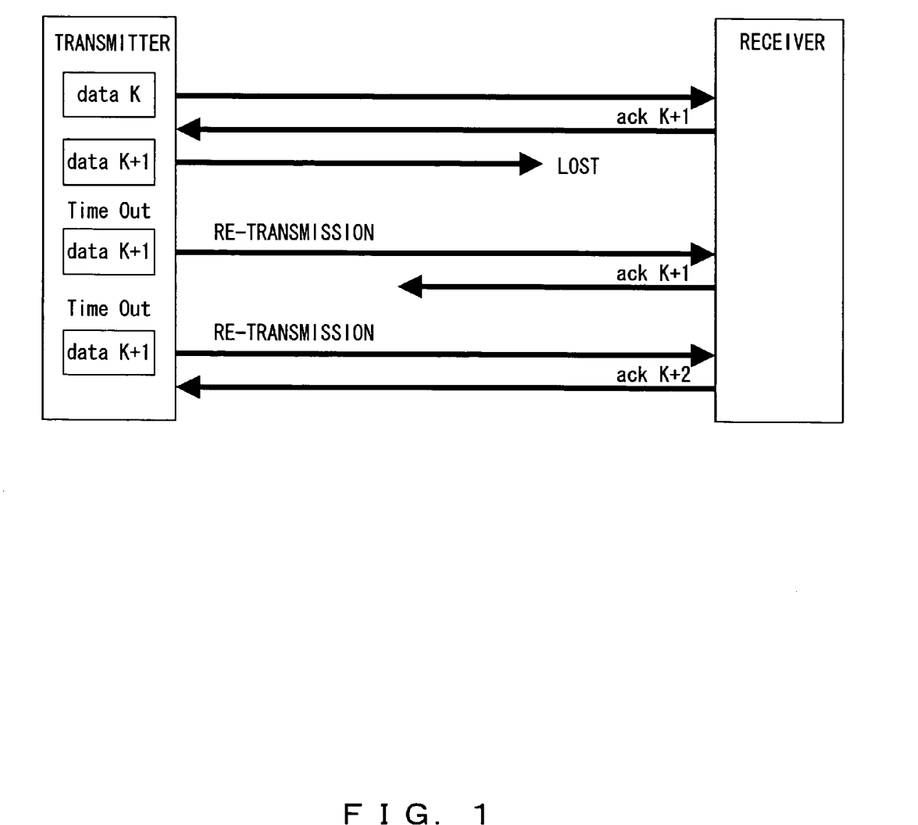
FIG. 1 explains the conventional ACK method (No. 1)
Figure 2:
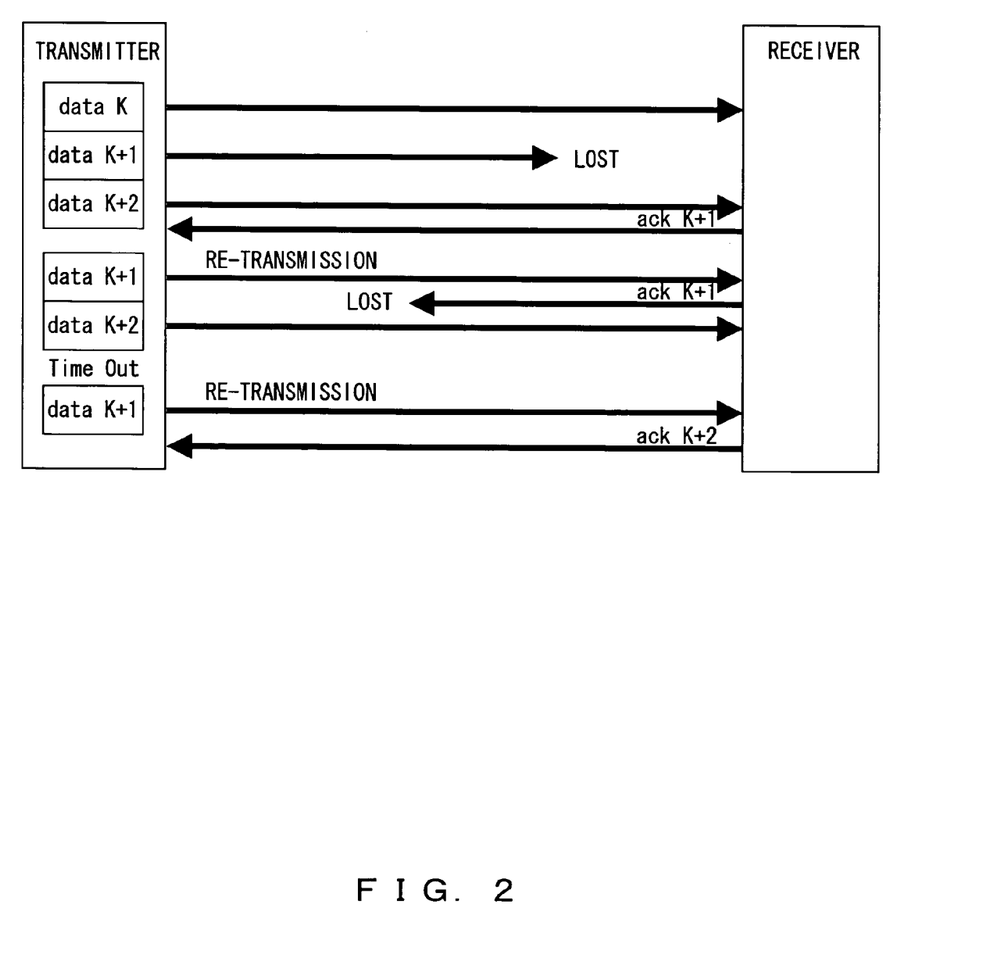
FIG. 2 explains the conventional ACK method (No. 2)

FIGS. 1 and 2 explain the conventional ACK method.

FIG. 1 explains Stop and Wait method. In order to perform re-transmission control, a transmitter transmits data, and a receiver returns ack to the transmitter every time receiving data. The transmitter recognized data received by the receiver by receiving ack, and if data is lost, it re-transmits the lost data. If ack is lost, the transmitter counts time elapsing after transmitting the last data and re-transmits by time-out. Such a method is called Stop and Wait.

In FIG. 1, the transmitter transmits data K to the receiver, ack K+1 is returned. Then, the transmitter transmits data K+1. In this case, if data K+1 is lost, the receiver does not transmit ack since the receiver receives no data K+1. Therefore, the transmitter continues to count time elapsing after transmitting data K+1 without receiving ack. When time-out occurs, the transmitter re-transmits data K+1. Upon receipt of this re-transmitted data K+1, the receiver returns ack K+2 to the transmitter. In this case, it is assumed that ack K+2 is lost. Then, since the transmitter cannot receive ack, the transmitter counts time elapsing after lastly re-transmitting data K+1, and if it is time-outed, the transmitter re-transmits data K+1 again. Upon normal receipt of the data K+1, the receiver transmits ack K+2 to the transmitter. Upon normal receipt of the ack K+2, the transmitter terminates the normal communication and transmits subsequent data.

FIG. 2 explains Go Back N method. If as shown in FIG. 1, a transmitter checks the receipt of ack every time transmitting data, efficiency degrades. Therefore, a plurality of segments of data is transmitted without ack. In this method, the transmitter transmits a plurality of segments of data without receiving ack. If data is lost, a receiver detects data loss, and requests the transmitter to re-transmit the lost data. In Go Back N, at this moment the transmitter transmits all data after the lost data requested to re-transmit. However, in Selective ACK, only the lost data is selectively transmitted. In either method, unless the transmitter receives ack, all data is re-transmitted by the time-out of the transmitter.

In FIG. 2, a transmitter transmits data K through data K+2 at one time, and if the loss of data K+1 is detected, a receiver transmits ack K+1 requesting the re-transmission of data K+1 to the transmitter. Upon receipt of ack K+1, the transmitter re-transmits both data K+1 and data K+2. Although upon receipt of data K+1, the receiver transmits ack K+1 to the transmitter, in FIG. 2, this ack is lost. Therefore, the transmitter counts time elapsing after transmitting data K+1, and if time-outed, the transmitter automatically re-transmits data K+1. When the receiver receives this data K+1, ack K+2 is transmitted to the transmitter.

Conventionally, in Patent Reference 1, a technology for performing the error recovery of a failure at a layer 2 level by the re-transmission function of the control message of layer 3 is disclosed. In Patent Reference 2 too, a technology for performing the error recovery of a failure at a layer 2 level at layer 3 is disclosed. In Patent Reference 3, a technology in which a transmitting station performs the poling of a receiving station in multicast transfer is disclosed. In Patent Reference 4, it is disclosed that re-transmission control in which redundancy is eliminated is performed in multi-cast. In Patent Reference 5, a system for making temporary transmission/reception confirmation/response is disclosed.

Patent Reference 1: Japanese Patent Application No. 5-183644

Patent Reference 2: Japanese Patent Application No. 5-122278

Patent Reference 3: Japanese Patent Application No. 11-196041

Patent Reference 4: Japanese Patent Application No. 2001-237883

Patent Reference 5: Japanese Patent Application No. 2002-247132

In the conventional re-transmission control method, when ack is transmitted/received between a transmitter and a receiver, the transmitter cannot determine which should be transmitted, new data or re-transmission data before receiving ack from the receiver. For this reason, the transmitter must always wait for ack after transmitting a specific of data. This cannot be theoretically avoided. The transmission/reception of ack requires Round Trip Time (RTT). If a transmitter and a receiver are far apart, RTT increases. Accordingly, ack receiving intervals expand, and as a result, communication performance degrades, which is a problem. In TCP, there is this problem, and it is known that performance degrades in long-haul communication.

Communication efficiency can be improved by combining Go Back N with Selective ACK. However, even in that case, subsequent data cannot be transmitted without receiving ack as reception confirmation, and a transmitter must transmit subsequent data by time-out.

SUMMARY OF THE INVENTION

The object of the present invention is to provide a technology for reducing non-communication time before receiving ack after transmitting data as much as possible in a re-transmission control method.

The communication device of the present invention is a method for requesting an opposite party to re-transmit data if the data is lost. The communication device comprises a redundant communication determination unit measuring a band to be used for redundancy, of a rated band and determining the contents of redundant communication, and a redundancy transmission unit redundantly transmitting a variety of data to be transmitted according to the determination of the redundant communication determination unit while observing the rated band.

The communication method of the present invention is a method for requesting an opposite party to re-transmit data if the data is lost. The communication method comprises the redundant communication determination step of measuring a band to be used for redundancy, of a rated band and determining the contents of redundant communication, and the redundancy transmission step of redundantly transmitting a variety of data to be transmitted according to the determination of the redundant communication determination unit while observing the rated band.

According to the present invention, in the communication method for requesting for ack, a variety of data, such as communication data, re-transmission data, acknowledgement and the like, is transmitted with redundancy. Therefore, there is a low possibility that all of the redundant data may be lost. Accordingly, reliable communication can be realized at high speed.

According to the present invention, in a re-transmission control method, by reducing time when no data is transmitted as much as possible, communication efficiency can be improved and high-speed communication can be realized.

DESCRIPTION OF THE PREFERRED EMBODIMENTS

The prior art is a method for entirely performing re-transmission control according to instructions from a receiver or by the time-out of a transmitter. However, in the preferred embodiment of the present invention, a transmitter transmits redundant data to a receiver without knowing the situation s of a receiver, whereas the receiver transmits ack to the transmitter with the recognition of waste. By conducting such redundant communication, the non-operation of a network due to waiting for the transmission/reception of ack is eliminated, and accordingly network resources can be effectively utilized. Recently since a wide-area broadband network has been used, a band-guaranteed network can be used. In this case, since redundant communication is conducted using the guaranteed band as an upper limit, resources can be effectively used.

Thus, by conducting such redundant communication, data loss on a network can be coped with. However, in this case, since a band to be originally used is wasted so much for the redundant communication, the original data communication band decreases. Therefore, a band for communication and that for redundant communication must be balanced. In the preferred embodiment of the present invention, a mechanism for controlling both the priority of redundant communication and a total communication band as requested is provided.

Figure 3:
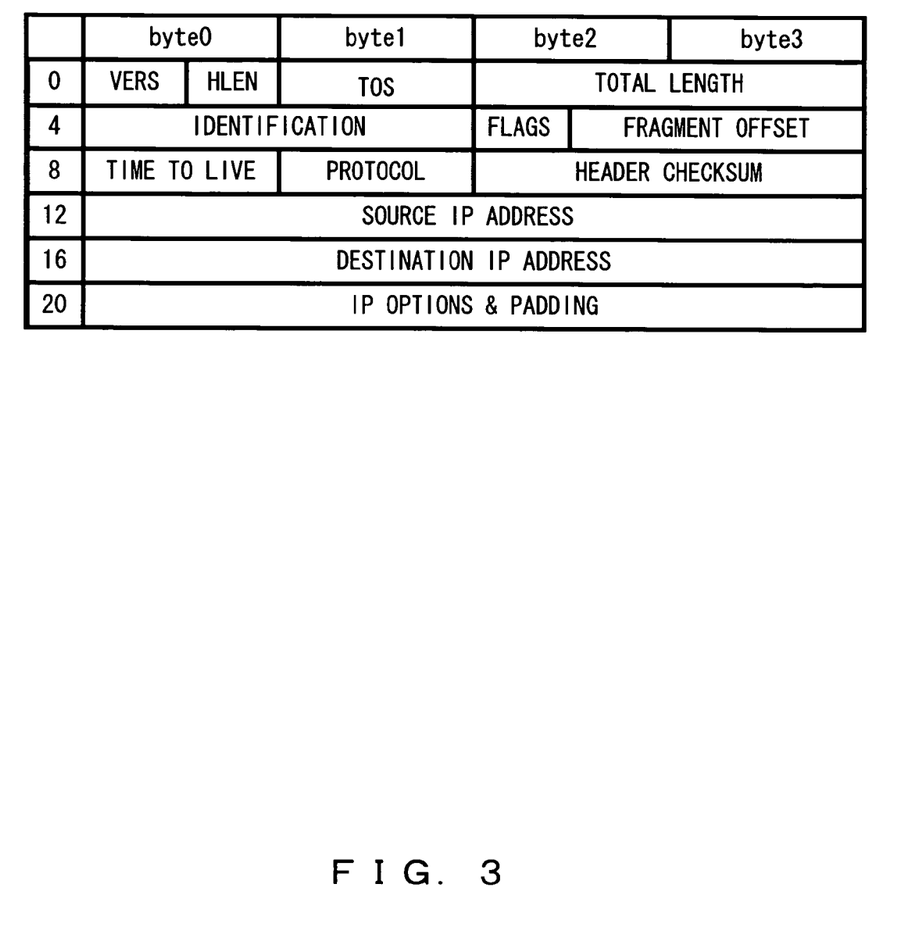
FIG. 3 explains the principle of the preferred embodiment of the present invention.

FIG. 3 explains the principle of the preferred embodiment of the present invention.

In the preferred embodiment of the present invention, the performance of the "reliable communication" in an environment with a large RTT is attempted to improve by a transmitter transmitting communication data in a designated communication band range and redundantly transmitting other necessary data including ack.

The preferred embodiment of the present invention comprises a mechanism for transmitting beforehand redundant data according to the situations in a proper communication band range in a transmitter. Although the preferred embodiment is described with reference to Internet protocol (IP), the application of the present invention is not limited to IP.

In FIG. 3, a transmitter transmits data K to a receiver in duplicate. If the data k reaches a receiver normally, the receiver discards the redundancy and receives the data k. The receiver too transmits ack K+1 to the transmitter in duplicate in order to notify the transmitter of the reception of the data K. The transmitter too discards the redundant ack. Even if one of the duplicate data K+1 that the transmitter transmitted to the receiver is lost, the other reaches the receiver normally. Since the receiver can receive data K+1, the receiver transmits ack K+2 to the transmitter in duplicate. Even if one of the duplicate ack K+2 is lost, the transmitter can receive ack normally. Therefore, the transmitter transmits data K+2 to the receiver in duplicate, and the receiver transmits the duplicate ack K+3.

Although in FIG. 3 redundancy is explained as duplication for convenience's sake, in reality duplication can also be changed according to the situations of a communication band.

Figure 4:
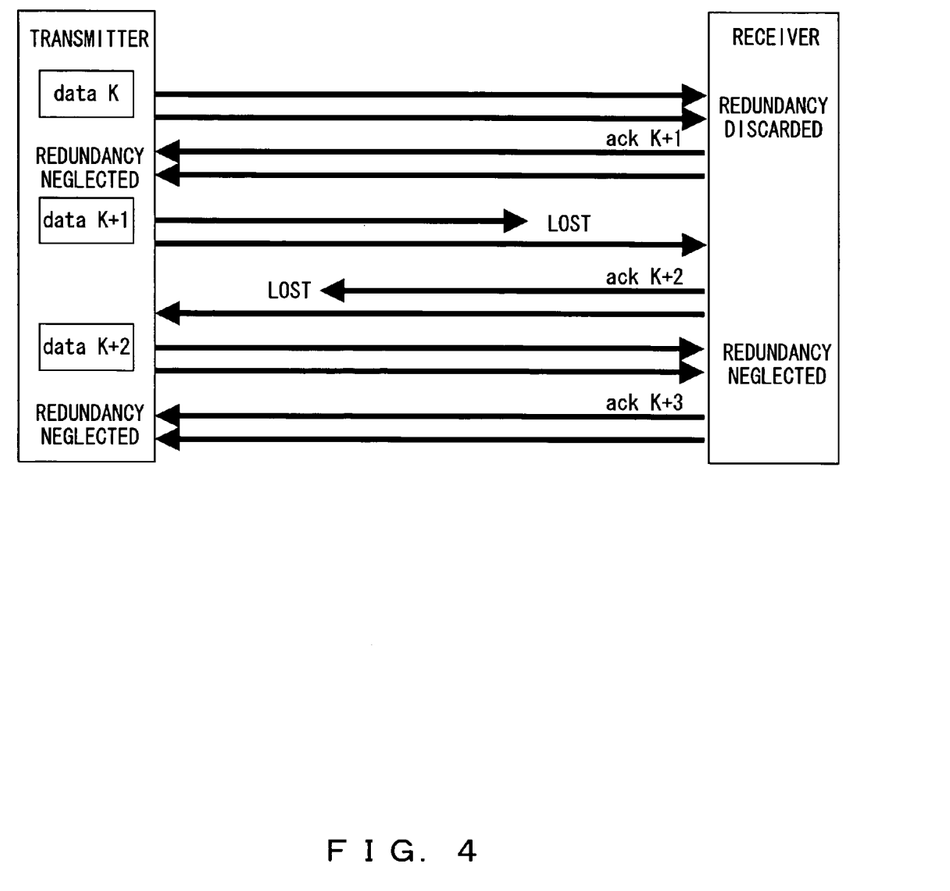
FIG. 4 shows the structure of the header of an IP packet.

FIG. 4 shows the structure of the header of an IP packet.

In the retransmission control method, generally information indicating the order of data (sequence number) is attached to data and is transmitted, and a receiver checks by this sequence number whether the received data arrived in correct order without loss or redundancy. If there is loss, the receiver transmits information indicating it to urge the transmitter to re-transmit data. The types of such control information and how to use it are a prior art (TCP, etc.) and is publicly known. The preferred embodiment of the present invention also uses similar information. This specification uses the following definition according to TCP.

Sequence number>Data K>The K-th data
ack number>ack K>ack urging the transmission of the K-th data If re-transmission control is performed in an IP layer, the IDENTIFICATION field of the IP header shown in FIG. 4 is rewritten into a sequence number, which is used.

In the preferred embodiment of the present invention, there are four types of data transmitted by a transmitter, and appropriate one of the transmission data is transmitted under band restriction.

Original communication data>Data which is originally communicated and is given from a higher-order layer
Re-transmission communication data>(Old) Communication data designated by ack
ack>ack to be transmitted as a receiver in bi-directional communication Un-related data>Communication data not targeted as "reliable communication"

How to transmit "un-related data" varies depending on a principle on which priority should be given to, target data of "reliable communication" or data not targeted. As to the transmission of redundant data, its description is omitted here since "un-related data" has no relation to it.

In order to perform re-transmission control by ACK method, information represented by TCP, such as a sequence number, an ACK number, a re-transmission control command (TCP FLAGS ACK bit), must be attached. Although the present invention is not limited to a protocol, it is assumed that such information is attached to communication data, as in TCP. Such information can be added to the existing or future-developed re-transmission control method.

Figure 5:
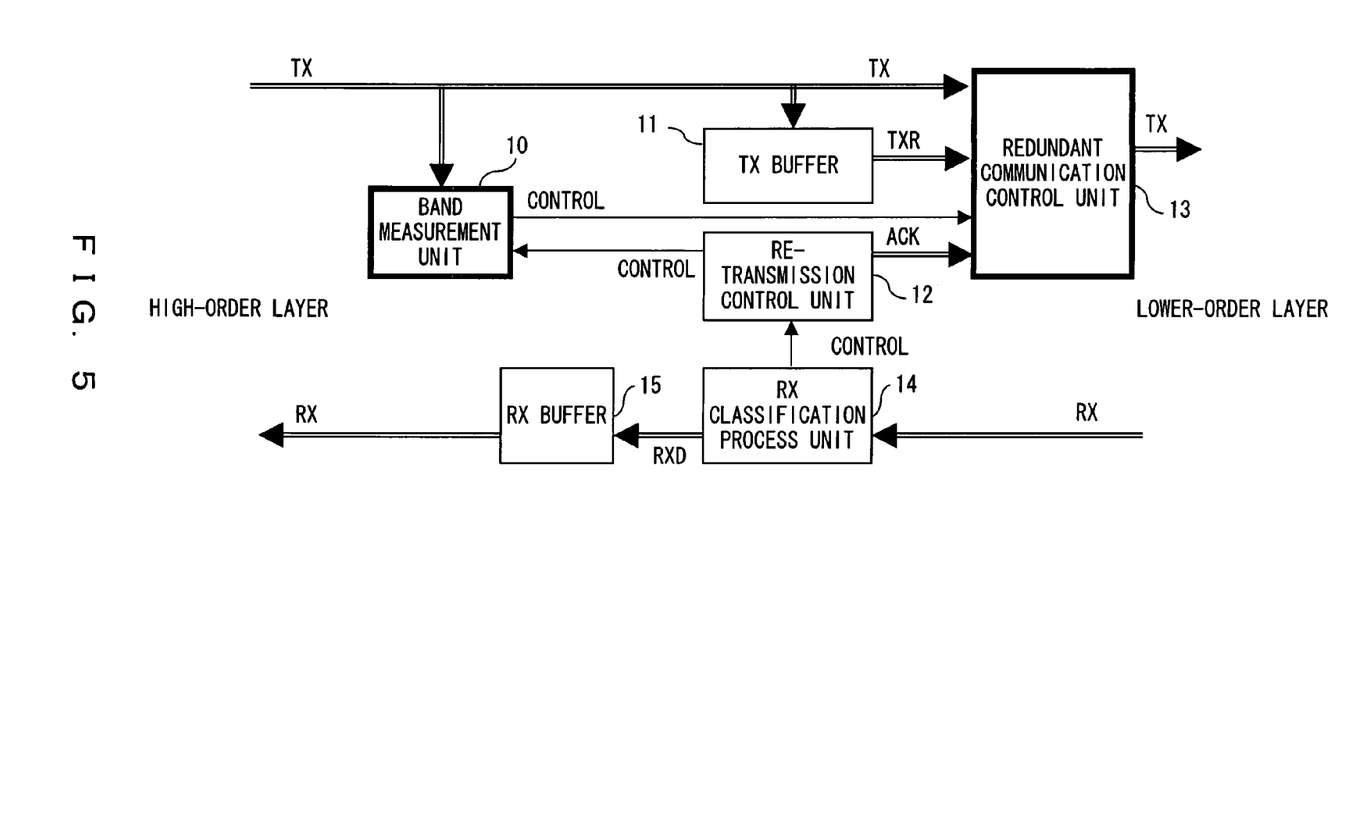
FIG. 5 is a block diagram showing the entire configuration of the communication device in the preferred embodiment of the present invention.

FIG. 5 is a block diagram showing the entire configuration of the communication device in the preferred embodiment of the present invention.

The preferred embodiment of the present invention is obtained by adding a band measurement unit 10 and a redundant communication unit 13 to a general re-transmission control mechanism. The band measurement unit 10 measures the respective rate of flow of transmission data (TX), reception data (RX), re-transmission data (TXR), acknowledgement data (ACK).

The redundant communication control unit 13 determines with what redundancy one data of TX, TXR and ACK should be transmitted and transmits it.

A TX buffer 11, RX buffer 15, an RX classification process unit 14 and a re-transmission control unit 12 are generally used in a normal re-transmission control system. The TX buffer 11 is buffer memory for storing re-transmission data until the re-transmission of transmission data becomes unnecessary. The RX buffer 15 is buffer memory for storing received data until the entire data is received in correct order without loss. The RX classification process unit 14 is a mechanism for classifying received data into communication data and acknowledgement data for re-transmission control. The re-transmission control unit 12 transmits the relevant communication data of the TX buffer 11 or deletes in response to acknowledgement from the communication party.

The band measurement unit 10 measures the rate of flow of communication data, and transfers the measurement result to the redundant communication control unit 13, which plays the role of providing basic data for redundant communication control.

The redundant communication control unit 13 is the essential part of the preferred embodiment of the present invention. The redundant communication control unit 13 determines the type and amount of data to be transmitted to a network, and actually transmits it to the network. The redundant communication control unit 13 determines both the ratio of redundant data to non-redundant data used when they are transmitted within a designated network band and transmission order, and actually transmits them.

Figure 6:
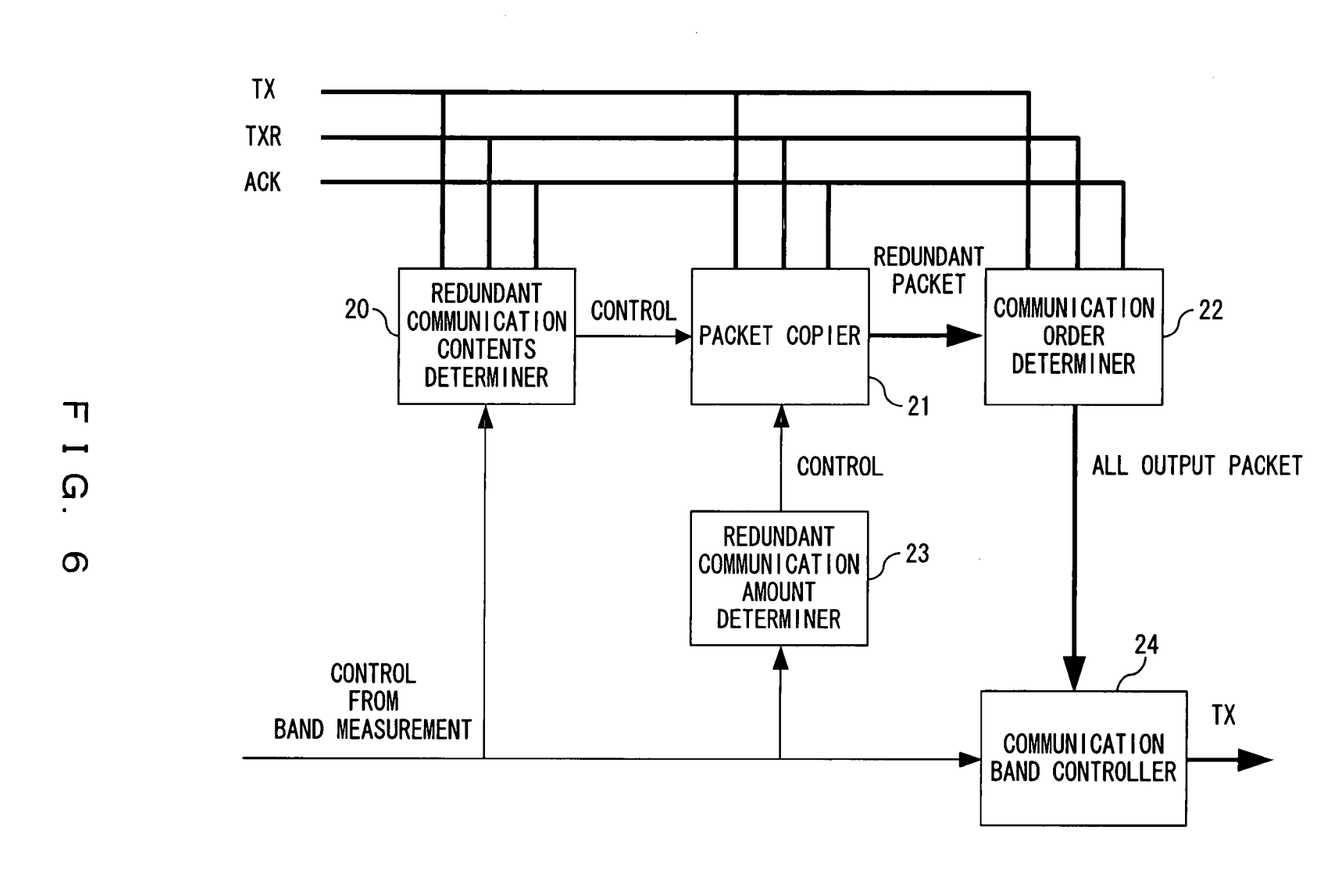
FIG. 6 explains the detailed redundant communication control unit according to the preferred embodiment of the present invention No. 1)
Figure 7:
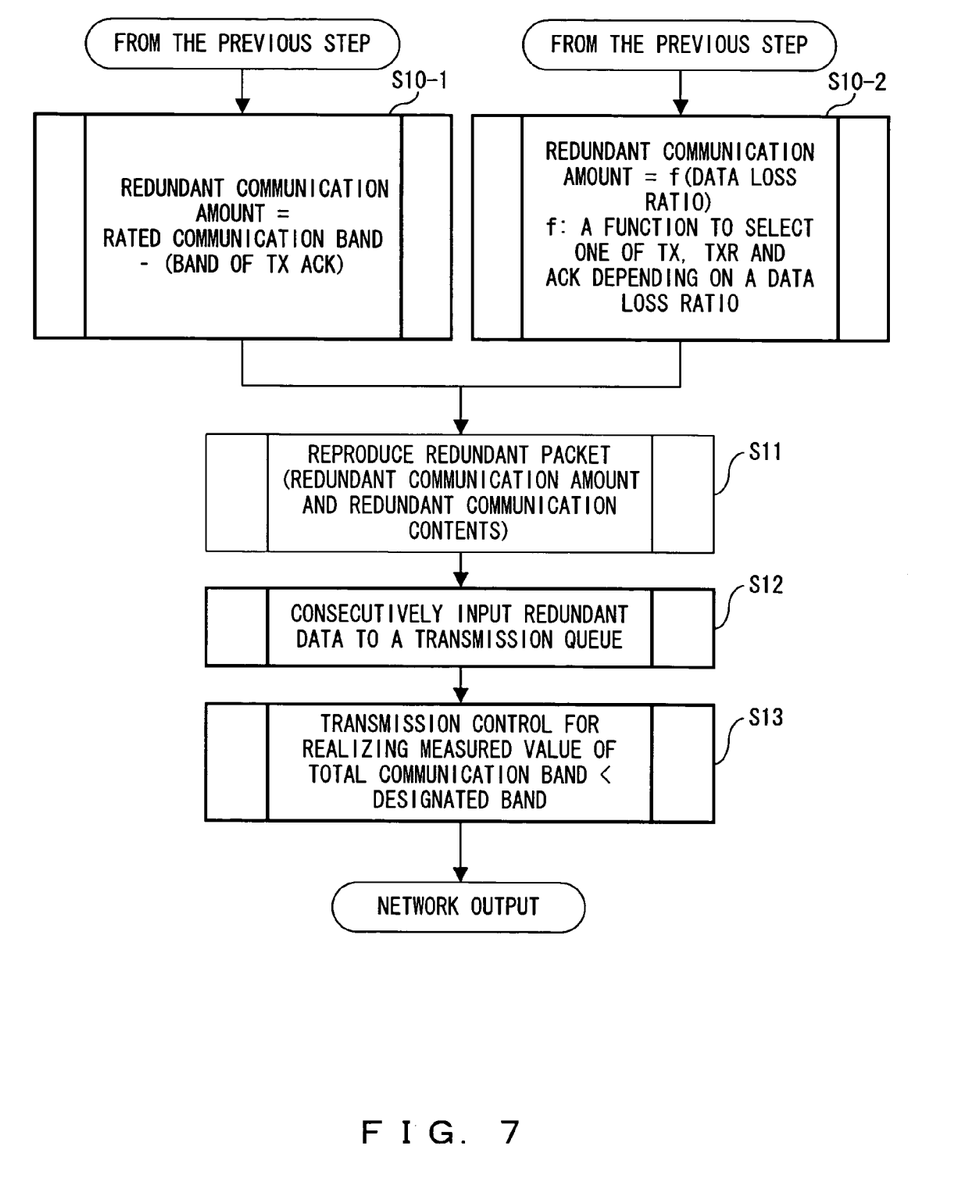
FIG. 7 explains the detailed redundant communication control unit according to the preferred embodiment of the present invention No. 2).

FIGS. 6 and 7 explains the detailed redundant communication control unit according to the preferred embodiment of the present invention.

The redundant communication control unit 13 comprises a redundant communication contents determiner 20, a packet duplicator 21, a communication order determiner 22, a redundant communication amount determiner 23 and a communication band controller 24.

Although the redundant communication contents determiner 20 transmits redundant data in a band range designated by a transmitter before receiving ack, at this moment the redundant communication contents determiner 20 determines both one to be redundantly transmitted of a plurality of segments of data to be generally transmitted and their transmission order.

As data which there is a possibility that a transmitter may transmit, there are new transmission data TX, re-transmission data TXR and ack for data transferred by a receiver. If there is no loss in these segments of data to be transmitted, it is efficient for the redundant communication contents determiner 20 to avoid redundant communication and to consecutively transmit new data. However, if there is a lot of data loss, conversely it is efficient to increase redundant communication. As a method for redundantly communicate, a method for predicting data loss possibility and redundantly transmitting data whose loss possibility is determined to be high, a method for redundantly transmitting data whose contents are important and the like. When transmitting data to a network, it can be expected that penalty at the time of data loss may be reduced by taking data transmission order into consideration.

If data is transmitted beyond a usable band, there is a possibility that data loss may increase and communication performance may degrade. However, the communication band controller 24 transmits data in a proper band range in order to avoid this.

The communication band controller 24 determines how to use a given communication band when transmitting redundant data and controls the band accordingly. The method for controlling a band is largely classified into two; a method for trusting a given communication band and transmitting data (fixed band control) and a method for observing communication situations and adaptively determining an available band (automatic band control).

The redundant communication amount determiner 23 redundantly transmits data using the room of a communication band (remaining band after transmitting both data to be essentially communicated and ack). More particularly, the redundant communication amount determiner 23 measures a data loss ratio. If as a result the data loss ratio is low, the redundant communication amount determiner 23 operates to reduce redundant communication. If the data loss ratio is high, the redundant communication amount determiner 23 operates to increase redundant communication.

The redundant communication contents determiner 20 measures data loss ratio when redundantly communicating, and at that moment determining data to be redundantly transmitted according to the result. More particularly, the redundant communication amount determiner 23 measures the occurrence ratio of data to be essentially transmitted and modify data to be redundantly transmitted, of data to be transmitted at that moment according to the result. Furthermore, the redundant communication amount determiner 23 measures a pattern in which data loss occurs and transmits data whose loss is predicted, with priority according to the result. The following items or their combinations are detected as a "pattern in which data loss occurs".

(1) A pattern in which data loss regularly occurs (2) A pattern in which data loss occurs in specific data (contents, data length, etc.)

Alternatively, the redundant communication contents determiner 20 can detect the contents of data to be reliably transmitted and redundantly transmit with priority data loss is predicted to cause a greater problem. The following cases are detected as data in which "a greater problem occurs if there is loss".

(1) Data whose arrival is expected in a specific cycle

An isochronous packet flowing through an IEEE1394 serial bus is transmitted as a packet in a specific cycle of 125 μsec. Therefore, it is expected that another isochronous packet arrives 125 μsec after one isochronous packet arrives.

Data, such as routing protocol and the like, in which routing information is transmitted/received in specific intervals (the transmission intervals are set by a system manager). For example, In Internet protocol version 6 (IPv6), a router advertisement packet is transmitted t specific intervals.

In routing information protocol (RIP), a negative broadcast packet is transmitted at specific intervals called "periodic RIP"

In open shortest path first (OSPF), a control packet called "hello packet" is transmitted at specific intervals in order to check the situations of an opposite party router (2) Data whose importance is determined to be higher, of a series of data A packet including acknowledgement information. For example, Data in which the ACK bit of the FLAGS field of a TCP packet is 1

Data with control information in which the SYE, FIN, RST bits of the FLAGS field Of a TCP packet are 1

Data in which the ACK bit of the asynchronous packet of an IEEE1394 serial bus is 1

The communication order determiner 22 consecutively transmits a plurality of segments of redundant data, transmits a pattern in which redundant data is non-redundant data are mixed a plurality of times, and transmits mixing data with a long packet length with data with a short packet length.

The communication band controller 24 measures a total transmission band and restricts a communication band so as not to exceed a designated communication band. More particularly, the communication band controller 24 sequentially measures the occurrence band of data to be essentially transmitted (input communication data), and restricts a communication band so as to minimize the average fluctuations of a specific period.

The packet duplicator 21 duplicates the contents of a packet when generating a redundant packet.

The operation of the device shown in FIG. 6 is described with reference to the flowchart shown in FIG. 7.

Steps S10-1 and S10-2 ate the operations of the redundant communication amount determiner. As described above, a person having ordinary skill in the art can realize the operation of the redundant communication amount determiner by a variety of methods. For example, as in step S10-1, the amount of redundant communication can be calculated by subtracting the respective bands of both communication data and ack from a rated communication band. Alternatively, as in step S10-2, a data loss ration is measured, and it can be determined which should be redundantly transmitted, communication data, re-transmission data or ack, based on the measurement result. Which data should be redundantly transmitted at what data loss ratio should be properly determined by a person having ordinary skill in the art.

In step S11, the duplicate of redundant packet id determined based on the amount of redundant communication and the contents of redundant communication. How much redundant communication should be duplicated is determined by a band available for redundant communication, such as the amount of redundant communication calculated above.

Step S12 is the operation of the communication order determiner. In step S12, redundant data is consecutively inputted to a transmission queue. Step S13 is the operation of the communication band controller. In step S13, transmission control is performed so that the measurement value of a total communication band is smaller than a designated band.

According to the preferred embodiment of the present invention, the communication speed of reliable communication can be improved in an environment where it takes much time to transmit/receive ack by anticipating data loss beforehand and redundantly transmitting data.

What is claimed is:

1. A communication device adopting a method for requesting an opposite party to re-transmit data if there is data loss, comprising:

a redundant communication determination unit measuring a band available for redundancy, in a rated band and determining contents of communication in which data is redundantly transmitted; and a redundant transmission unit redundantly transmitting a variety of data to be transmitted according to the determination of the redundant communication determination unit while keeping the rated band.

2. The communication device according to claim 1, wherein data to be redundantly transmitted is one of essential communication data, re-transmission data and acknowledgement data indicating the reception of data.

3. The communication device according to claim 2, wherein the data to be redundantly transmitted is determined based on a measured data loss ratio.

4. The communication device according to claim 2, wherein the band for redundant communication is obtained by subtracting respective bands used to transmit both essential communication data and acknowledgement from the available band.

5. The communication device according to claim 1, wherein data to be easily lost or data which causes a problem when lost is redundantly transmitted with priority.

6. A communication method for requesting an opposite party to re-transmit data if there is data loss, comprising:

measuring a band available for redundancy, in a rated band and determining contents of communication in which data is redundantly transmitted; and redundantly transmitting a variety of data to be transmitted according to the determination of the redundant communication determination step while keeping the rated band.

7. The communication method according to claim 6, wherein data to be redundantly transmitted is one of essential communication data, re-transmission data and acknowledgement data indicating the reception of data.

8. The communication method according to claim 7, wherein the data to be redundantly transmitted is determined based on a measured data loss ratio.

9. The communication method according to claim 7, wherein the band for redundant communication is obtained by subtracting respective bands used to transmit both essential communication data and acknowledgement from the available band.

10. The communication method according to claim 6, wherein data to be easily lost or data which causes a problem when lost is redundantly transmitted with priority.

11. A computer-readable portable storage medium on which is recorded a program for enabling a computer which communicates by a method for requesting an opposite party to re-transmit data if there is data loss to execute a process, said process comprising:
  measuring a band available for redundancy, in a rated band and determining contents of communication in which data is redundantly transmitted; and
  redundantly transmitting a variety of data to be transmitted according to the determination of the redundant communication determination step while keeping the rated band.

12. The storage medium according to claim 11, wherein data to be redundantly transmitted is one of essential communication data, re-transmission data and acknowledgement data indicating the reception of data.

13. The storage medium according to claim 12, wherein the data to be redundantly transmitted is determined based on a measured data loss ratio.

14. The storage medium according to claim 12, wherein the band for redundant communication is obtained by subtracting respective bands used to transmit both essential communication data and acknowledgement from the available band.

15. The storage medium according to claim 11, wherein data to be easily lost or data which causes a problem when lost is redundantly transmitted with priority.

* * * * *